US012704821B2

(12) United States Patent
Sato

(10) Patent No.: US 12,704,821 B2
(45) Date of Patent: Aug. 11, 2026

(54) CONTROL APPARATUS, LEARNING APPARATUS, CONTROL SYSTEM, CONTROL METHOD, AND NON-TRANSITORY COMPUTER READABLE MEDIUM

(71) Applicant: NEC Corporation, Tokyo (JP)

(72) Inventor: Natsuhiko Sato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 634 days.

(21) Appl. No.: 18/022,441

(22) PCT Filed: Sep. 29, 2020

(86) PCT No.: PCT/JP2020/036848
§ 371 (c)(1),
(2) Date: Feb. 21, 2023

(87) PCT Pub. No.: WO2022/070244
PCT Pub. Date: Apr. 7, 2022

(65) Prior Publication Data
US 2023/0359158 A1 Nov. 9, 2023

(51) Int. Cl.
*G05B 17/02* (2006.01)
*G05B 13/02* (2006.01)

(52) U.S. Cl.
CPC ......... *G05B 17/02* (2013.01); *G05B 13/0265* (2013.01)

(58) Field of Classification Search
CPC ............................ G05B 13/0265; G05B 17/02
See application file for complete search history.

(56) References Cited

U.S. PATENT DOCUMENTS 7,437,014 B2 * 10/2008 Kim ........................ G05B 17/02 703/2
2018/0292799 A1 * 10/2018 Shiramizu .............. G05B 19/05
2021/0195386 A1 * 6/2021 Hajimiri ................. H04W 4/33
2021/0325838 A1 * 10/2021 Abe ......................... G06N 5/04
2024/0255918 A1 * 8/2024 Takami .................. G06N 20/00

FOREIGN PATENT DOCUMENTS

JP H02-202602 A 8/1990
JP H02202602 * 8/1990
JP H10-201274 A 7/1998
JP 2001-025986 A 1/2001
JP 2020-165702 A 10/2020

OTHER PUBLICATIONS

International Search Report for PCT Application No. PCT/JP2020/036848, mailed on Nov. 24, 2020.

* cited by examiner

*Primary Examiner* — Thomas K Pham
(74) *Attorney, Agent, or Firm* — Sughrue Mion, PLLC

(57) ABSTRACT

An object of the present disclosure is to provide a control apparatus capable of adjusting an amount of information to be input to a learner in order to improve the accuracy of a control content in a control target apparatus. A control apparatus (10) according to the present disclosure includes: a decision unit (11) configured to decide a measurement period for a sensor to measure a physical amount used to decide a control content in a control target apparatus; an acquisition unit (12) configured to acquire a result of analyzing the control content in the control target apparatus decided based on the physical amount measured in the measurement period; and a control unit (13) configured to decide the measurement period of the physical amount based on the result of the analysis.

14 Claims, 6 Drawing Sheets

CONTROL APPARATUS, LEARNING APPARATUS, CONTROL SYSTEM, CONTROL METHOD, AND NON-TRANSITORY COMPUTER READABLE MEDIUM

This application is a National Stage Entry of PCT/JP2020/036848 filed on Sep. 29, 2020, the contents of all of which are incorporated herein by reference, in their entirety.

TECHNICAL FIELD

The present disclosure relates to a control apparatus, a learning apparatus, a control system, a control method, and a program.

BACKGROUND ART

In recent years, more and more robots have been used in various fields. For example, when an operator operates a robot, a remote operation via a communication network is performed. Patent Literature 1 discloses predicting a delay that occurs in communication between an operator and a robot and controlling a timing when commands transmitted from the operator via the communication network are generated in such a way that these commands reach the robot at regular intervals.

Generally, when a robot is controlled, the state of the robot is modelled by representing the state of the robot by using a differential equation. The model using the differential equation requires not only a physical amount indicating the state of the robot but also the derivative value of the physical amount. The state of the robot may be modeled by using, for example, a differential equation such as $mx''+dx'=gu(t)$ that includes a second-order differential.

In general, when a robot is controlled, the position of the robot and the speed of the robot need to be computed. The speed of the robot is computed as a derivative value of the position of the robot. For example, as an appropriate control of the robot at a time t, the position and the speed at the time t may be input into a learner that uses a neural network or the like and a result output from the learner may be applied.

CITATION LIST

Patent Literature

[Patent Literature 1] Japanese Unexamined Patent Application Publication No. 2001-25986

SUMMARY OF INVENTION

Technical Problem

When the robot is controlled, the speed at the time t is estimated based on the current position of the robot and the past position of the robot. However, the speed thus estimated may include noise of a sensor that detects the state of the robot or a quantization error. In this case, a learner performs learning using the speed that includes noise of the sensor or the quantization error. Therefore, it is possible that an appropriate control content in the robot may not be output.

In order to deal with the aforementioned problem, it is possible to enter the current and past positions of the robot into the learner and cause the learner to learn the control content at the time t along with the speed at the time t instead of entering the speed estimated at the time t into the learner. In this case, the learner is able to learn the control content in which the noise or the quantization error included in the estimated speed is taken into account. In this case, however, there is a problem that the control content may be changed or the control content may vary depending on how far back in time the past positional information is to be input to the learner. Further, when the amount of the positional information to be input to the learner is large, there is a problem that the learning time increases although it is possible to reduce the influence of the noise or the like. On the other hand, when the amount of the positional information to be input to the learner is small, there is a problem that the influence of the noise or the like cannot be eliminated although the learning time decreases.

An object of the present disclosure is to provide a control apparatus, a learning apparatus, a control system, a control method, and a program capable of adjusting an amount of information to be input to a learner in order to improve an accuracy of a control content in a control target apparatus.

Solution to Problem

A control apparatus according to a first aspect of the present disclosure includes: decision means for deciding a measurement period for a sensor to measure a physical amount used to decide a control content in a control target apparatus; acquisition means for acquiring a result of analyzing the control content in the control target apparatus decided based on the physical amount measured in the measurement period; and control means for deciding the measurement period of the physical amount based on the result of the analysis.

A learning apparatus according to a second aspect of the present disclosure includes: decision means for deciding a measurement period for a sensor to measure a physical amount used to decide a control content in a control target apparatus; learning means for receiving the physical amount measured in the measurement period and learning the control content in the control target apparatus; analysis means for analyzing the control content; and control means for deciding, based on the result of the analysis, the measurement period of the physical amount to be collected.

A control system according to a third aspect of the present disclosure includes: decision means for deciding a measurement period for a sensor to measure a physical amount used to decide a control content in a control target apparatus; analysis means for acquiring a result of analyzing the control content in the control target apparatus decided based on the physical amount measured in the measurement period; and control means for deciding the measurement period of the physical amount based on the result of the analysis.

A control method according to a fourth aspect of the present disclosure includes: deciding a measurement period for a sensor to measure a physical amount used to decide a control content in a control target apparatus; acquiring a result of analyzing the control content in the control target apparatus decided based on the physical amount measured in the measurement period; and deciding the measurement period of the physical amount based on the result of the analysis.

A program according to a fifth aspect of the present disclosure causes a computer to execute: deciding a measurement period of a physical amount used to decide a control content in a control target apparatus, the physical amount being measured in a sensor that measures the physical amount of the control target apparatus; acquiring a result of analyzing the control content in the control target apparatus decided based on the physical amount measured in the measurement period; and changing, based on the result of the analysis, the measurement period of the physical amount.

Advantageous Effects of Invention

According to the present disclosure, it is possible to provide a control apparatus capable of adjusting an amount of information to be input to a learner in order to improve an accuracy of a control content in a control target apparatus.

EXAMPLE EMBODIMENT

First Example Embodiment

Figure 1:
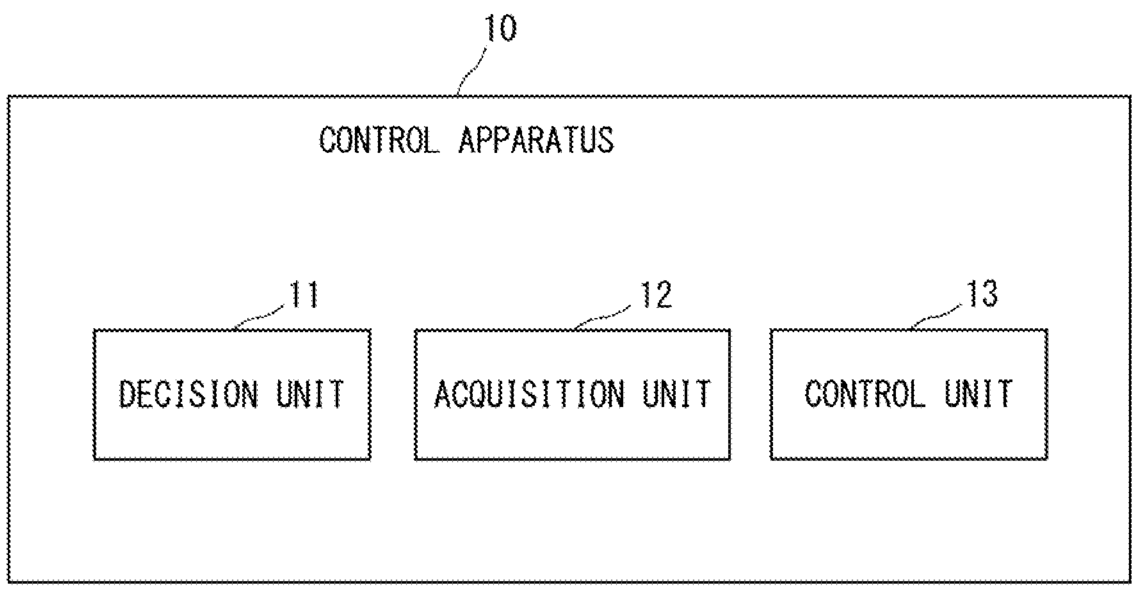
FIG. 1 is a configuration diagram of a control apparatus according to a first example embodiment.

Hereinafter, with reference to the drawings, example embodiments of the present disclosure will be described. First, with reference to FIG. 1, a configuration example of a control apparatus 10 according to a first example embodiment will be described. The control apparatus 10 may be a computer apparatus that is operated by a processor executing a program stored in a memory. The control apparatus 10 may be, for example, a server apparatus.

The control apparatus 10 includes a decision unit 11, an acquisition unit 12, and a control unit 13. The components of the control apparatus 10 such as the decision unit 11, the acquisition unit 12, and the control unit 13 may be software or modules whose processing is executed by the processor executing the program stored in the memory. Alternatively, the components of the control apparatus 10 may be hardware such as circuits or chips.

The decision unit 11 decides a measurement period of a physical amount that is used to decide a control content in a control target apparatus (not shown). The physical amount is measured in a sensor that measures the physical amount of the control target apparatus. In the present disclosure, the control target apparatus means a physical apparatus on which the result of the control by the control apparatus 10 should be reflected, and whose operation is to be simulated by a simulator that is not shown in FIG. 1.

The control target apparatus may be a computer apparatus that is remotely operated by an operation terminal operated by an operator or the like. The control target apparatus may be, for example, a robot or a vehicle on which the computer apparatus is mounted.

The physical amount may be the position of the control target apparatus, the distance from a predetermined position to the current position, the speed, the acceleration, an angle with respect to a predetermined axis, the angular velocity, the weight or the like. The sensor measures at least one or more kinds of physical amounts among the physical amounts such as the position of the control target apparatus. Measuring here may also referred to as detecting or sensing. The sensor may be mounted on, for example, the control target apparatus. The control apparatus 10 transmits or receives data by communicating with the sensor. The control apparatus 10 may perform, for example, wireless communication or wired communication with the sensor.

The measurement period is a period between two measurement timings when the sensor measures the physical amount of the control target apparatus. The measurement period may include two or more measurement timings by the sensor.

The acquisition unit 12 acquires a result of analyzing the control content in the control target apparatus decided based on the physical amount measured in the decided measurement period. The control content in the control apparatus may be, for example, to decide the moving direction or the moving speed of the control target apparatus. Alternatively, when the control target apparatus is a robot, the control content may be work or the like to be executed by a robot. The result of analyzing the control content may be, for example, a result of an analysis as to whether the result of executing the control content that has been decided shows that a predetermined service quality is satisfied or the control target apparatus is able to execute a predetermined operation. That is, the result of analyzing the control content may be information as to whether the result of executing the control content that has been decided shows that a predetermined condition is satisfied. Specifically, the result of the analysis may be, for example, information indicating whether or not the service quality is satisfied or whether or not the predetermined operation can be executed.

The result of the analysis may be a result obtained by causing a simulator or the like that has simulated the processing or the operation of the control target apparatus to execute the control content that has been decided. Further, the simulator may simulate, besides the control target apparatus, the processing or the operation of the sensor. That is, the simulator may generate the result of the measurement in the sensor in the measurement period decided by the decision unit 11 and generate a result of processing when the control content decided based on the result of the measurement in the sensor is executed on the control target apparatus. Further, the simulator may generate the result of the analysis as to whether or not the result of the processing when the control content is executed on the control target apparatus satisfies a predetermined service quality.

When the simulator is used, the decision unit 11 may transmit the decided measurement period to the simulator and the acquisition unit 12 may receive the result of the analysis from the simulator.

The control unit 13 changes the measurement period of the physical amount measured by the sensor based on the result of the analysis. For example, the control unit 13 may maintain or reduce the measurement period when, for example, the result of the analysis shows that a predetermined service quality is satisfied or a predetermined operation can be executed. Further, the control unit 13 may increase the measurement period when, for example, the result of the analysis does not satisfy a predetermined service quality or a predetermined operation cannot be executed.

As described above, by using the control apparatus 10, it is possible to change the measurement period in the sensor of the physical amount used to decide the control content in accordance with the result of the analysis on the control target apparatus that operates in accordance with the control content that has been decided.

When, for example, the control target apparatus does not perform a desired operation, it is possible that the physical amount in a predetermined measurement period used to decide the control content may include noise or the like. In this case, by making the measurement period in the sensor longer than the predetermined measurement period, the influence of the noise or the like can be reduced and the accuracy of the control content can be improved. Further, when the control target apparatus performs a desired operation, the accuracy of the control content may be maintained by maintaining the current measurement period. Alternatively, when the control target apparatus performs a desired operation, the learning efficiency may be improved by reducing the measurement period. Maintaining or improving the accuracy of the control content means to make the control target apparatus that operates in accordance with the control content that has been decided satisfy a predetermined service quality or the like.

Second Example Embodiment

Figure 2:
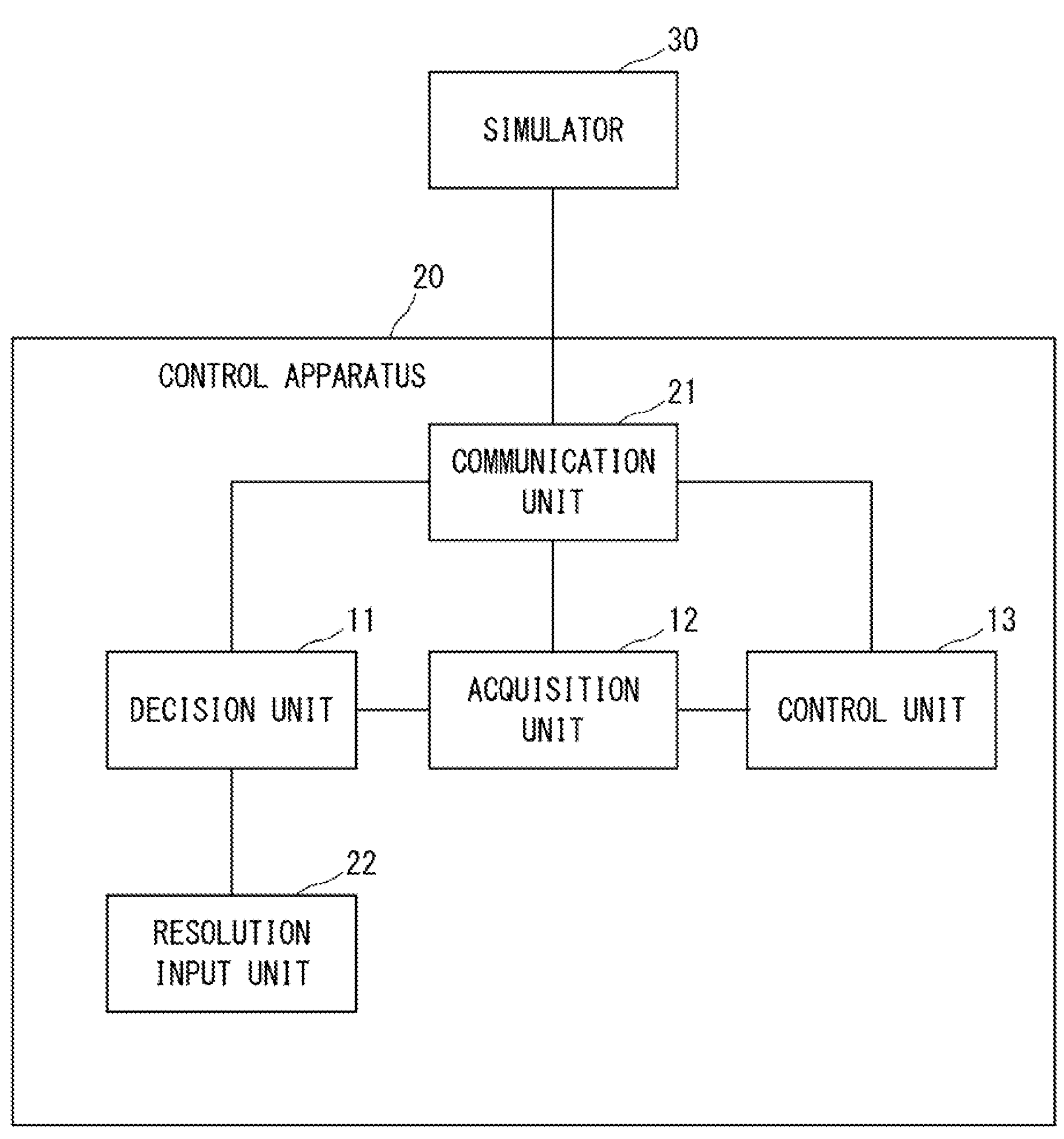
FIG. 2 is a configuration diagram of a control apparatus according to a second example embodiment.

Referring next to FIG. 2, a configuration example of a control apparatus 20 according to a second example embodiment will be described. The control apparatus 20 further includes, besides the components of the control apparatus 10 shown in FIG. 1, a communication unit 21 and a resolution input unit 22. The detailed descriptions of the functions or the operations of the decision unit 11, the acquisition unit 12, and the control unit 13 in the control apparatus 20 that are similar to those of the control apparatus 10 in FIG. 1 will be omitted.

The communication unit 21 transmits or receives data to or from a simulator 30. The communication unit 21 may communicate with the simulator 30 via a wireless line or via a wired line. The communication via the wireless line may be, for example, a wireless Local Area Network (LAN) communication or a mobile communication that uses 3rd Generation Partnership Project (3GPP) communication standards such as Long Term Evolution (LTE) or 5th Generation (5G).

The simulator 30 is an apparatus that simulates the operations of the control target apparatus and the sensor. Specifically, the simulator 30 simulates the operation of the control target apparatus when the predetermined control content is executed and further simulates processing of measuring the physical amount regarding the control target apparatus in the sensor. The simulator 30 may further simulate processing of deciding the control target content based on the physical amount.

The communication unit 21 transmits information regarding the measurement period of the physical amount in the sensor decided in the decision unit 11 to the simulator 30. The communication unit 21 further transmits information regarding the measurement period updated in the control unit 13 to the simulator 30. The communication unit 21 further acquires information regarding the result of analyzing the control target apparatus analyzed in the simulator 30 and outputs the acquired information to the acquisition unit 12.

The resolution input unit 22 outputs the information regarding the resolution of the sensor that measures the physical amount of the control target apparatus to the decision unit 11. The resolution of the sensor includes a resolution of the physical amount measured by the sensor and a time resolution indicating the measurement timing by the sensor. The resolution of the physical amount may be referred to as a quantization resolution. The quantization resolution is a value indicating the minimum change amount of the physical amount that can be measured by the sensor. Further, the time resolution is a value indicating the minimum measurement intervals when the sensor measures the physical amount. The resolution may also be referred to as, for example, a measurement accuracy.

The resolution input unit 22 outputs information regarding the resolution set in the sensor simulated in the simulator 30 to the decision unit 11. The resolution input unit 22 is able to change the resolution to be output to the decision unit 11 in accordance with the type, the capability or the like of the sensor simulated in the simulator 30. The quantization resolution is denoted by $\Delta f$ and the time resolution is denoted by $\Delta t$.

Next, a measurement period in the sensor decided by the decision unit 11 will be described. The measurement period in the sensor decided by the decision unit 11 may also be referred to as a period during which the physical amount used to decide the control content is measured. The decision unit 11 receives the quantization resolution $\Delta f$ and the time resolution $\Delta t$ of the sensor simulated in the simulator 30 from the resolution input unit 22.

Here, the physical amount measured at time t by the sensor simulated by the simulator 30 is denoted by f(t). The following description will be given using the position of the control target apparatus as the physical amount and the speed as the value of the time derivative of the physical amount. Further, the true physical amount of the control target apparatus at time t is denoted by F(t). In this case, F(t) is defined as shown in the following Expression 1 when the quantization error is taken into account.

$$f(t) - \frac{\Delta f}{2} < F(t) < f(t) + \frac{\Delta f}{2} \quad \text{(Expression 1)}$$

Further, the estimated value $V_f$ of the time derivative when the measurement period is set to be a k section is defined as shown in the following Expression 2. The k section may also be referred to as a k step. The symbol k in the k section indicates a positive integer and one section corresponds to the period of $\Delta t$. That is, the k section corresponds to the period of $k\Delta t$. It can also be said, for example, that the k section means that the number of steps is k.

$$V_f = \frac{F(t + k\Delta t) - f(t)}{k\Delta t} \quad \text{(Expression 2)}$$

Here, Expression 2 may be modified as shown in the following Expression 3 using Expression 1.

$$\frac{f(t + k\Delta t) - f(t)}{k\Delta t} - \frac{\Delta f}{k\Delta t} < V_f < \frac{f(t + k\Delta t) - f(t)}{k\Delta t} + \frac{\Delta f}{k\Delta t} \quad \text{(Expression 3)}$$

It is only when $\Delta f/(k\Delta t)$ (the symbol "/" indicates division. Hereinafter the same.) is sufficiently smaller than the true speed V(t) that the average speed of the k section can be correctly estimated using the estimated value $V_f$ from Expression 3. In other words, when $\Delta f/(k\Delta t)$ is sufficiently small, $V_f$ is estimated to be $\{f(t+k\Delta t)-f(t)\}/(k\Delta t)$. That is, $V(t)>>\Delta f/(k\Delta t)$ needs to be satisfied. Here, the minimum speed that cannot be considered as 0 in terms of control when the control target apparatus is controlled is denoted by v. The minimum speed that cannot be considered as 0 in terms of control may be defined, for example, based on a randomly decided speed such as one several hundredths of a randomly decided speed. Alternatively, the minimum speed that cannot be considered as 0 in terms of control may be defined as v when 99% or more becomes v or larger in the distribution of the true speed of the control target apparatus. When the speed of the control target apparatus is smaller than v, the speed of the control target apparatus is regarded as 0. In this case, $V(t)>v$ is satisfied. It is only when v is sufficiently smaller than $\Delta f/(k\Delta t)$ that the average speed of the k section can be correctly estimated, which is when $v>>\Delta f/(k\Delta t)$ is satisfied.

From the above discussion, the condition that is applied to the number of steps k, which is the measurement period, in order to correctly estimate the average speed of the k section is defined to be $k>>\Delta f/(v\Delta t)$. The decision unit 11 decides the initial value of the measurement period to be $\Delta f/(v\Delta t)$ and transmits the decided initial value to the simulator 30 via the communication unit 21.

The simulator 30 analyzes the control content in the control target apparatus decided using the physical amount measured in the sensor during the initial value of the measurement period. The acquisition unit 12 acquires the result of the analysis in the simulator 30 from the simulator 30 via the communication unit 21.

Here, when the result of the analysis acquired in the acquisition unit 12 indicates that an operation or the like of the control target apparatus does not satisfy a predetermined condition, it is considered that the influence of a quantization error or the like included in the physical amount used to decide the control content in the control target apparatus is large. In this case, by increasing the number of physical amounts used to decide the control content in the control target apparatus, the influence of the quantization error or the like can be reduced. Therefore, when the result of the analysis acquired in the acquisition unit 12 indicates that the operation or the like of the control target apparatus does not satisfy the predetermined condition, the control unit 13 transmits the measurement period longer than the initial value to the simulator 30 via the communication unit 21.

The control unit 13 repeats changing the measurement period until the result of the analysis acquired in the acquisition unit 12 indicates that the operation or the like of the control target apparatus satisfies a predetermined condition.

Figure 3:
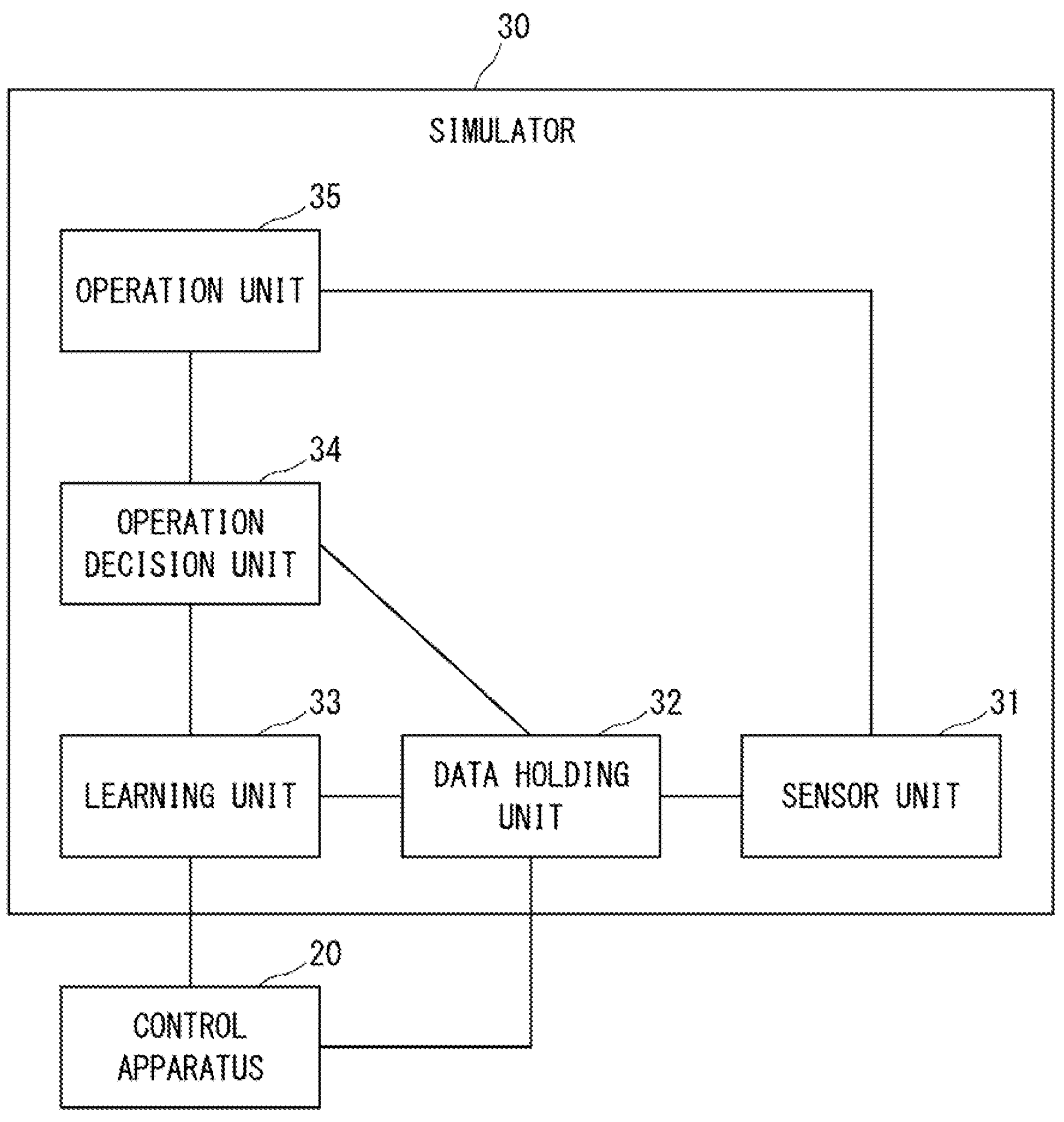
FIG. 3 is a configuration diagram of a simulator according to the second example embodiment.

Referring next to FIG. 3, a configuration example of the simulator 30 according to the second example embodiment will be described. The simulator 30 may be a computer apparatus that is operated by the processor executing the program stored in the memory.

The simulator 30 includes a sensor unit 31, a data holding unit 32, a learning unit 33, an operation decision unit 34, and an operation unit 35. The components of the simulator 30 such as the sensor unit 31, the data holding unit 32, the learning unit 33, the operation decision unit 34, and the operation unit 35 may be software or modules whose processing is executed by a processor executing a program stored in a memory. Alternatively, the components of the simulator 30 may be hardware such as circuits or chips.

The sensor unit 31 simulates the result of measuring the physical amount of the control target apparatus. For example, the sensor unit 31 outputs, as a result of measuring the control target apparatus, the position of the control target apparatus, the distance from a predetermined position to the current position, the speed, the acceleration, an angle with respect to a predetermined axis, the angular velocity, the weight or the like to the data holding unit 32.

In this example, the sensor unit 31 measures the control target apparatus simulated by the operation unit 35. The sensor unit 31 may output, for example, the physical amount in accordance with a predetermined program and a measurement condition for each control target apparatus. The measurement condition may be, for example, a parameter indicating the measurement time or may be a parameter indicating an external environment or the like such as a temperature. The administrator or the like of the simulator 30 may enter parameters into the sensor unit 31. The data holding unit 32 holds (stores) information regarding the physical amount output from the sensor unit 31. Further, the sensor unit 31 executes measurement processing in accordance with a preset resolution. The preset resolution is the same value as the resolution that the resolution input unit 22 in the control apparatus 20 outputs to the decision unit 11.

The learning unit 33 generates a learning model for deciding the control content in the control target apparatus using the information regarding the physical amount held in the data holding unit 32 and the information regarding the measurement period received from the control apparatus 20 as input parameters. The learning unit 33 acquires the information regarding the physical amount measured in the measurement period received from the control apparatus 20 from the data holding unit 32. The learning unit 33 updates, for example, the weight or the like regarding each input parameter and generates the learning model for deciding the control content. The control content may be, for example, the content of the operation executed in the control target apparatus.

The operation decision unit 34 decides the control content using the learning model generated in the learning unit 33, and decides the control content executed in the control target apparatus. The operation decision unit 34 outputs the control content that has been decided to the operation unit 35 and the data holding unit 32. The data holding unit 32 holds the control content decided by the operation decision unit 34.

The operation unit 35 simulates the operation of the control target apparatus. The operation unit 35 generates information regarding the result of the operation in accordance with the control content output from the operation decision unit 34, and outputs the generated information to the sensor unit 31. In other words, the sensor unit 31 detects the operation of the operation unit 35 in accordance with the control content output from the operation decision unit 34 and generates a physical amount regarding the result of the operation in the operation unit 35. The operation unit 35 may output, for example, the result of the operation in accordance with a predetermined program and a measurement condition for each control target apparatus. The measurement condition may be, for example, a parameter that indicates the measurement time or a parameter indicating an external environment such as a temperature. The administrator or the like of the simulator 30 may enter the parameter into the operation unit 35.

The data holding unit 32 acquires the result of the operation from the sensor unit 31 and transmits information on the result of the operation to the control apparatus 20. The information on the result of the operation may include information regarding whether or not the operation of the control target apparatus simulated in the operation unit 35 satisfies a predetermined condition. For example, the data holding unit 32 may hold a predetermined condition regarding the control target apparatus and determine whether or not the result of the operation acquired from the sensor unit 31 satisfies a predetermined condition.

Figure 4:
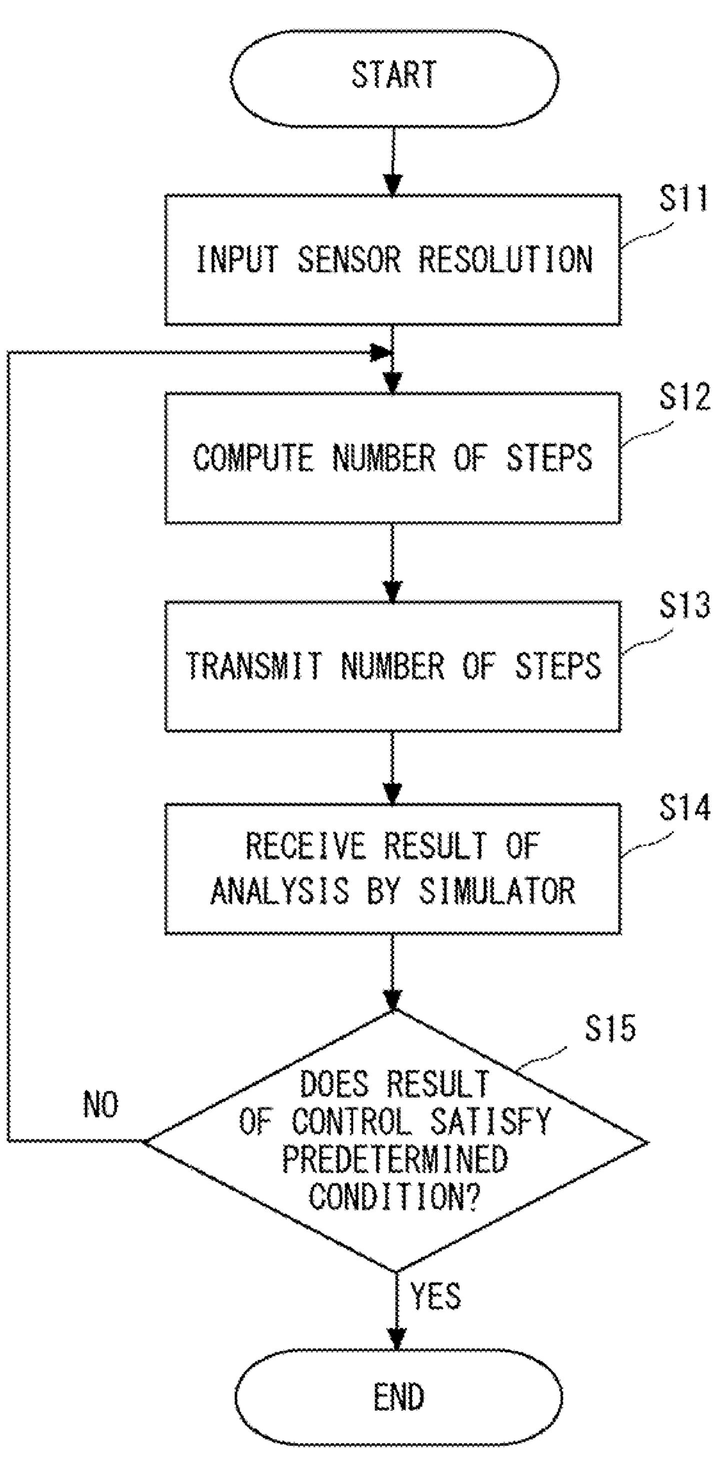
FIG. 4 is a diagram showing a flow of processing for generating the number of steps according to the second example embodiment.

Referring next to FIG. 4, a flow of processing for generating the number of steps for output to the simulator 30 in the control apparatus 20 according to the second example embodiment will be described.

First, the resolution input unit 22 receives information regarding the sensor resolution (S11). The resolution input unit 22 may receive, for example, information regarding the sensor resolution input by an administrator or the like who manages the control apparatus 20. The information regarding the sensor resolution is, for example, a resolution set in the sensor unit 31 which simulates the actual sensor that measures the control target apparatus. The information regarding the sensor resolution includes the resolution of the physical amount measured by the sensor and the time resolution indicating the measurement timing in the sensor.

Next, the decision unit 11 computes the number of steps, which is the measurement period of the physical amount used by the learning unit 33 when generating a learning model to decide the control content among the physical amounts output from the sensor unit 31 in the simulator 30 (S12). The decision unit 11 decides the initial value of the number of steps to be $\Delta f/(v\Delta t)$. The symbol $\Delta f$ denotes the resolution of the physical amount, $\Delta t$ denotes the time resolution, and v denotes the minimum speed that cannot be considered as 0 in terms of control.

Next, the communication unit 21 transmits the initial value of the number of steps decided in the decision unit 11 to the simulator 30 (S13). Next, the acquisition unit 12 receives information indicating the result of the analysis regarding the operation of the control target apparatus from the simulator 30 that has simulated the operation of the control target apparatus using the number of steps transmitted in Step S12 (S14).

Next, the control unit 13 determines whether or not the result of the analysis in the simulator 30 satisfies a predetermined condition (S15). When the result of the control by the simulator 30 does not satisfy the predetermined condition, the control unit 13 repeats processing after Step S12. When the processing after the processing in the acquisition unit 12 is repeated, the control unit 13 may set a value of integral multiple of the initial value as the number of steps or may set any value that is larger than the initial value as the number of steps. When the result of the control by the simulator 30 satisfies the predetermined condition, the control unit 13 ends the processing.

Figure 5:
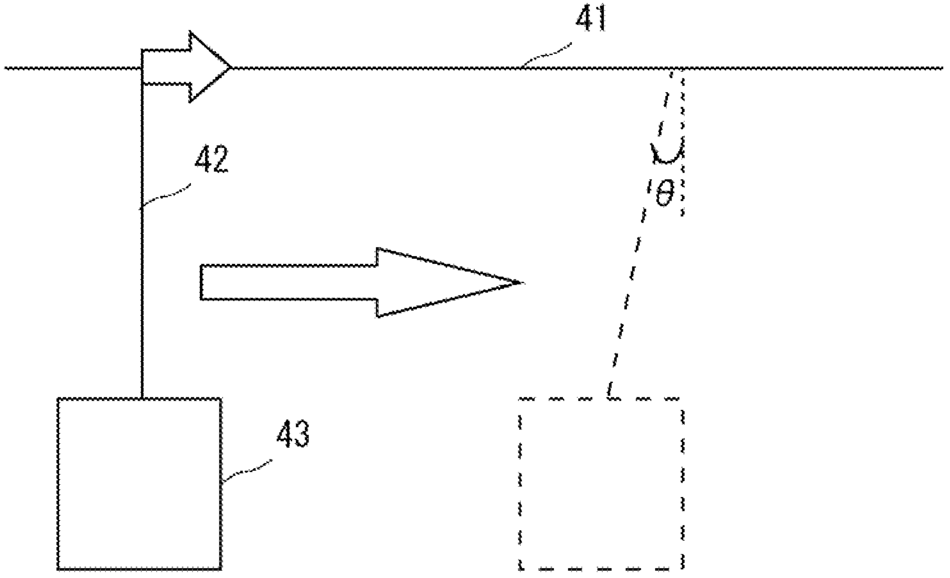
FIG. 5 is a diagram showing processing for computing the number of steps using a suspension crane according to the second example embodiment.

Next, with reference to FIG. 5, processing for computing the number of steps based on an example of an operation of a suspension crane will be specifically described. FIG. 5 shows a system for moving a load 43 suspended by a crane 42 by moving the crane 42 in the direction of an arrow along a rail 41. The solid lines of the crane 42 and the load 43 shown in FIG. 5 show a state of the crane 42 and the load 43 before they move and the dotted lines of the crane 42 and the load 43 shown in FIG. 5 show a state of the crane 42 and the load 43 while they are moving. The crane 42 moves along the rail 41 by using an actuator (not shown). It is expected, regarding the operation of the suspension crane shown in FIG. 5, that the crane 42 be moved in such a way that the swing of the load 43 becomes smaller. The swing of the load 43 being small means that the tilt θ of the crane 42 with respect to the vertical direction of the rail 41 is smaller than a predetermined angle.

For example, the operation unit 35 in the simulator 30 simulates the operations of the crane 42 and the load 43 and the sensor unit 31 simulates the sensor that measures the position of the crane 42 on the rail 41. In this example, the resolution of the physical amount set in the sensor unit 31 is set to be 1 millimeter (mm) and the time resolution is set to be 20 milliseconds (ms). That is, the sensor unit 31 is able to measure the position of the crane 42 for every 20 ms and detect the movement of the crane 42 by 1 mm or more. Further, the minimum speed that cannot be considered as 0 in terms of control in the sensor unit 31 is set to be 0.01 m/s (meter per second).

In this case, the decision unit 11 decides the initial value k1 of the number of steps to be $k1=1\ mm/(0.01\ m/s\times 20\ ms)=5$. The decision unit 11 transmits the number of steps 5 to the simulator 30. In this case, the learning unit 33 of the simulator 30 performs machine learning for deciding the control content using the physical amount measured in a period 5Δt traced back from the time t among the physical amounts stored (recorded) in the data holding unit 32 of the simulator 30. Here, the operation decision unit 34 of the simulator 30 decides the value of the voltage applied to the actuator as the control content at the time t. By deciding the value of the voltage applied to the actuator, it is possible to decide the speed at which the crane moves along the rail.

Here, the sensor unit 31 of the simulator 30 measures the tilt θ of the crane with respect to the vertical direction of the rail when the crane is moved. The control unit 13 receives information regarding whether or not the tilt θ of the crane measured in the sensor unit 31 is smaller than a predetermined angle from the simulator 30. The control unit 13 determines whether or not the tilt θ of the crane is smaller than a predetermined angle. The tilt θ of the crane being smaller than a predetermined angle means that the load 43 is moving with less swing.

When it is determined that the tilt θ of the crane is smaller than the predetermined angle, the control unit 13 stops the processing for computing the number of steps. When it is determined that the tilt θ of the crane is larger than the predetermined angle, the control unit 13 changes the number of steps and transmits the changed number of steps to the simulator 30. The control unit 13 may change the number of steps to, for example, 10, which is twice as large as the current number of steps, which is 5. The control unit 13 may change the number of steps to any integral multiple such as three times, not twice the current number of steps. Alternatively, the control unit 13 may change the number of steps to a desired value that is larger than the current number of steps. By increasing the number of steps, the learning unit 33 is able to use physical amounts measured in a longer period, whereby the influence of the quantization error or the like can be reduced and the accuracy of the decided control content can be improved.

As described above, the control apparatus 20 repeats changing the number of steps and decides the number of steps in which the angle θ of the crane computed by the simulator 30 becomes smaller than a predetermined angle.

As described above, the control apparatus 20 according to the second example embodiment is able to decide the measurement period of the physical amount to be used for learning among the physical amounts output from the sensor unit 31 in such a way that the operation of the control target apparatus in the simulator 30 satisfies a predetermined condition.

Further, the control apparatus 20 outputs the decided number of steps to the actual control target apparatus simulated by the simulator 30. Like in the operation in the simulator 30, the actual control target apparatus decides the control content and operates the decided control content based on the physical amount measured by the sensor. Here, the actual control target apparatus simulated by the simulator 30 is able to decide the control content using the number of steps decided using the simulator 30. When the number of steps decided using the simulator 30 is not used, the actual control target apparatus simulated by the simulator 30 needs to repeatedly execute the learning processing executed in the simulator 30 in the control target apparatus in order to decide the optimal number of steps. On the other hand, the actual control target apparatus simulated by the simulator 30 is able to reduce the process load regarding the learning processing by using the number of steps decided using the simulator 30.

Further, while the control apparatus 20 and the simulator 30 have been described as apparatuses different from each other in the second example embodiment, the simulator 30 may include the control apparatus 20. That is, the control apparatus 20 and the simulator 30 may be configured as an integrated apparatus.

While the configuration in which the simulator 30 simulates the control target apparatus and the sensor has been described in the second example embodiment, the simulator that simulates the control target apparatus and the simulator that simulates the sensor may be different from each other.

Figure 6:
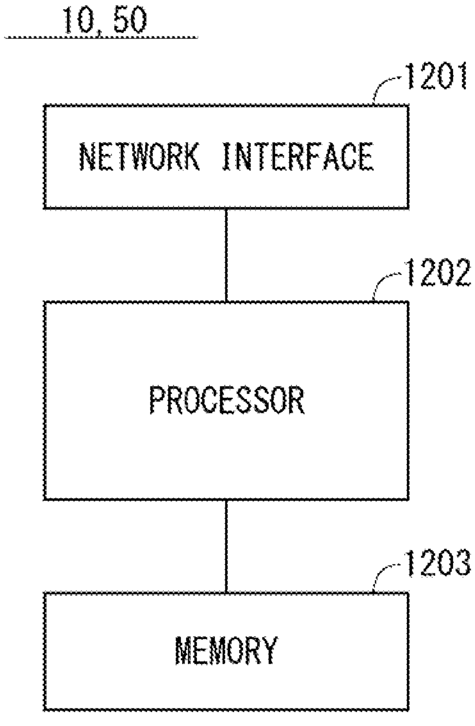
FIG. 6 is a configuration diagram of a control apparatus and a simulator according to each of the example embodiments.

FIG. 6 is a block diagram showing a configuration example of the control apparatus 10, the control apparatus 20, and the simulator 30 (hereinafter "the control apparatus 10 and the like"). Referring to FIG. 6, the control apparatus 10 and the like include a network interface 1201, a processor 1202, and a memory 1203. The network interface 1201 may be used to communicate with a network node (e.g., eNB, MME, or P-GW). The network interface 1201 may include, for example, a network interface card (NIC) conforming to IEEE 802.3 series. Note that eNB stands for evolved Node B, MME stands for Mobility Management Entity, and P-GW stands for Packet Data Network Gateway. IEEE stands for Institute of Electrical and Electronics Engineers.

The processor 1202 loads software (computer program) from the memory 1203 and executes the loaded software (computer program), thereby performing processing of the control apparatus 10 and the like described with reference to the flowchart in the aforementioned example embodiments. The processor 1202 may include, for example, a microprocessor, an MPU, or a CPU. The processor 1202 may include a plurality of processors.

The memory 1203 is composed of a combination of a volatile memory and a non-volatile memory. The memory 1203 may include a storage located away from the processor 1202. In this case, the processor 1202 may access the memory 1203 via an Input/Output (I/O) interface (not shown).

In the example shown in FIG. 6, the memory 1203 is used to store software modules. The processor 1202 loads these software modules from the memory 1203 and executes the loaded software modules, thereby being able to perform processing of the control apparatus 10 and the like described in the aforementioned example embodiments.

As described with reference to FIG. 6, each of the processors included in the control apparatus 10 and the like in the aforementioned example embodiments executes one or more programs including instructions for causing a computer to execute the algorithm described with reference to the drawings.

In the aforementioned examples, the program may be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), CD-Read Only Memory (ROM), CD-R, CD-R/W, semiconductor memories (e.g., mask ROM, Programmable ROM (PROM), Erasable PROM (EPROM), flash ROM, Random Access Memory (RAM)). Further, the program may be provided to a computer using any type of transitory computer readable medium. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present disclosure is not limited to the aforementioned example embodiments and may be changed as appropriate without departing from the spirit of the present disclosure.

The whole or part of the example embodiments disclosed above can be described as, but not limited to, the following supplementary notes.

(Supplementary Note 1)

A control apparatus comprising:

decision means for deciding a measurement period for a sensor to measure a physical amount used to decide a control content in a control target apparatus;

acquisition means for acquiring a result of analyzing the control content in the control target apparatus decided based on the physical amount measured in the measurement period; and control means for deciding the measurement period of the physical amount based on the result of the analysis.

(Supplementary Note 2)

The control apparatus according to Supplementary Note 1, wherein the control means changes the measurement period of the physical amount when the result of the analysis does not satisfy a predetermined condition.

(Supplementary Note 3)

The control apparatus according to Supplementary Note 1 or 2, wherein the control means repeats changing the measurement period of the physical amount until the result of the analysis satisfies the predetermined condition.

(Supplementary Note 4)

The control apparatus according to any one of Supplementary Notes 1 to 3, wherein the control means changes, when the result of the analysis does not satisfy the predetermined condition, the measurement period in such a way that the measurement period becomes longer than the current measurement period.

(Supplementary Note 5)

The control apparatus according to Supplementary Note 4, wherein the control means multiplies the current measurement period by an integer when the result of the analysis does not satisfy the predetermined condition.

(Supplementary Note 6)

The control apparatus according to any one of Supplementary Notes 1 to 5, wherein the decision means decides the measurement period based on a resolution of the physical amount and a time resolution regarding a measurement timing when the sensor measures the physical amount.

(Supplementary Note 7)

The control apparatus according to Supplementary Note 6, wherein the decision means computes, when the resolution of the physical amount is denoted by $\Delta f$, the time resolution is denoted by $\Delta t$, and the minimum speed of the control target apparatus that the sensor can use as the speed of the control target apparatus is denoted by v, a measurement period based on the value of $\Delta f/(v\times\Delta t)$.

(Supplementary Note 8)

The control apparatus according to Supplementary Note 7, wherein the decision means transmits the measurement period computed based on the value of $\Delta f/(v\times\Delta t)$, which is an initial value, to a simulator that analyzes the control content in the control target apparatus.

(Supplementary Note 9)

The control apparatus according to any one of Supplementary Notes 1 to 8, wherein the acquisition means acquires the result of the analysis from a simulator that analyzes the control content in the control target apparatus.

(Supplementary Note 10)

The control apparatus according to any one of Supplementary Notes 1 to 9, wherein the control means transmits the measurement period after the change to a simulator that analyzes the control content in the control target apparatus.

(Supplementary Note 11)

A learning apparatus comprising:

decision means for deciding a measurement period for a sensor to measure a physical amount used to decide a control content in a control target apparatus;

learning means for receiving the physical amount measured in the measurement period and learning the control content in the control target apparatus;

analysis means for analyzing the control content; and control means for deciding, based on the result of the analysis, the measurement period of the physical amount to be collected.

(Supplementary Note 12)

The learning apparatus according to Supplementary Note 11, wherein the learning means learns the control content in the control target apparatus using a derivative value of the physical amount along with the physical amount.

(Supplementary Note 13)

The learning apparatus according to Supplementary Note 11 or 12, wherein the control means changes the measurement period of the physical amount when the result of the analysis does not satisfy a predetermined condition.

(Supplementary Note 14)

The learning apparatus according to any one of Supplementary Notes 11 to 13, wherein the control means repeats changing the measurement period of the physical amount until the result of the analysis satisfies the predetermined condition.

(Supplementary Note 15)

The learning apparatus according to any one of Supplementary Notes 11 to 14, wherein the control means changes, when the result of the analysis does not satisfy the predetermined condition, the measurement period in such a way that the measurement period becomes longer than the current measurement period.

(Supplementary Note 16)

The learning apparatus according to Supplementary Note 15, wherein the control means multiplies the current measurement period by an integer when the result of the analysis does not satisfy the predetermined condition.

(Supplementary Note 17)

The learning apparatus according to any one of Supplementary Notes 11 to 16, wherein the decision means decides the measurement period based on a resolution of the physical amount and a time resolution regarding a measurement timing when the sensor measures the physical amount.

(Supplementary Note 18)

The learning apparatus according to Supplementary Note 17, wherein the decision means computes, when the resolution of the physical amount is denoted by $\Delta f$, the time resolution is denoted by $\Delta t$, and the minimum speed of the control target apparatus that the sensor can use as the speed of the control target apparatus is denoted by v, a measurement period based on the value of $\Delta f/(v\times\Delta t)$.

(Supplementary Note 19)

The learning apparatus according to Supplementary Note 18, wherein the learning means analyzes the control content in the control target apparatus with the measurement period computed based on the value of $\Delta f/(v\times\Delta t)$ as an initial value.

(Supplementary Note 20)

The learning apparatus according to Supplementary Note 19, wherein the learning means repeats, after analyzing the control content in the control target apparatus using the initial value, analyzing the control content in the control target apparatus using the measurement period after the change.

(Supplementary Note 21)

A control system comprising:

decision means for deciding a measurement period for a sensor to measure a physical amount used to decide a control content in a control target apparatus;

analysis means for acquiring a result of analyzing the control content in the control target apparatus decided based on the physical amount measured in the measurement period; and control means for deciding the measurement period of the physical amount based on the result of the analysis.

(Supplementary Note 22)

The control system according to Supplementary Note 21, wherein the control means changes the measurement period of the physical amount when the result of the analysis does not satisfy a predetermined condition.

(Supplementary Note 23)

A control method comprising:

deciding a measurement period for a sensor to measure a physical amount used to decide a control content in a control target apparatus;

acquiring a result of analyzing the control content in the control target apparatus decided based on the physical amount measured in the measurement period; and deciding the measurement period of the physical amount based on the result of the analysis.

(Supplementary Note 24)

A control method comprising:

deciding a measurement period for a sensor to measure a physical amount used to decide a control content in a control target apparatus;

receiving the physical amount measured in the measurement period and then learning the control content in the control target apparatus;

analyzing the control content; and deciding, based on the result of the analysis, the measurement period of the physical amount to be collected.

(Supplementary Note 25)

A non-transitory computer readable medium storing a program for causing a computer to execute:

deciding a measurement period for a sensor to measure a physical amount used to decide a control content in a control target apparatus;

acquiring a result of analyzing the control content in the control target apparatus decided based on the physical amount measured in the measurement period; and deciding the measurement period of the physical amount based on the result of the analysis.

(Supplementary Note 26)

A non-transitory computer readable medium storing a program for causing a computer to execute:

deciding a measurement period for a sensor to measure a physical amount used to decide a control content in a control target apparatus;

receiving the physical amount measured in the measurement period and then learning the control content in the control target apparatus;

analyzing the control content; and deciding, based on the result of the analysis, the measurement period of the physical amount to be collected.

REFERENCE SIGNS LIST

10 Control Apparatus
11 Decision Unit
12 Acquisition Unit
13 Control Unit
20 Control Apparatus
21 Communication Unit
22 Resolution Input Unit
30 Simulator
31 Sensor Unit
32 Data Holding Unit
33 Learning Unit
34 Operation Decision Unit
35 Operation Unit
41 Rail
42 Crane
43 Load

What is claimed is:

1. A control apparatus comprising:

at least one memory storing instructions, and at least one processor, wherein the instructions, when executed by the at least one processor, cause the control apparatus to:

receive resolution information indicating a resolution of a sensor of a robot, the resolution information comprising: (i) quantization resolution information indicating a minimum amount of change that can be detected by the sensor, and (ii) time resolution information indicating a minimum time interval between two measurements of the sensor;

determine, for the robot to perform at least one operation, an initial value of a total measurement period for the sensor based on the resolution information;

transmit, to a simulator, at least one total measurement period value comprising the initial value, to cause the simulator to simulate the performance of the robot performing the at least one operation with the at least one total measurement period value;

receive, from the simulator, at least one simulation result indicating whether the simulated performance satisfied a predetermined condition with respect to the at least one total measurement period value;

select, based on one of the at least one simulation result satisfying the predetermined condition, the corresponding total measurement period as a final measurement period; and output the final measurement period to the robot to cause the robot to use the final measurement period when performing the at least one operation.

2. The control apparatus according to claim 1, wherein the instructions, when executed by the at least one processor, cause the control apparatus to:

change the total measurement period when one of the at least one simulation result does not satisfy the predetermined condition.

3. The control apparatus according to claim 2, wherein the instructions, when executed by the at least one processor, cause the control apparatus to: repeat changing the total measurement period until one of the at least one simulation result satisfies the predetermined condition.

4. The control apparatus according to claim 2, wherein the instructions, when executed by the at least one processor, cause the control apparatus to: change the total measurement period such that the total measurement period becomes longer than a current total measurement period.

5. The control apparatus according to claim 4, wherein the instructions, when executed by the at least one processor, cause the control apparatus to change the total measurement period by multiplying the current total measurement period by an integer.

6. The control apparatus according to claim 1, wherein the instructions, when executed by the at least one processor, cause the control apparatus to compute the initial value based on a value of $\Delta f/(v\times\Delta t)$, wherein $\Delta f$ is a value of the quantization resolution information, $\Delta t$ is a value of the time resolution information, and v is a minimum speed threshold where speeds below the threshold are multiplied by 0.

7. An integrated control apparatus and simulator comprising:

at least one memory storing instructions, and at least one processor, wherein the instructions, when executed by the at least one processor, cause the integrated control apparatus and simulator to:

receive resolution information indicating a resolution of a sensor of a robot, the resolution information comprising: (i) quantization resolution information indicating a minimum amount of change that can be detected by the sensor, and (ii) time resolution information indicating a minimum time interval between two measurements of the sensor;

determine, for the robot to perform at least one operation, an initial value of a total measurement period for the sensor based on the resolution information;

simulate, using at least one total measurement period value comprising the initial value, the performance of the robot performing the at least one operation;

determine at least one simulation result indicating whether the simulated performance satisfied a predetermined condition with respect to the at least one total measurement period value;

select, based on one of the at least one simulation result satisfying the predetermined condition, the corresponding total measurement period as a final measurement period; and output the final measurement period to the robot to cause the robot to use the final measurement period when performing the at least one operation.

8. The integrated control apparatus and simulator according to claim 7, wherein the instructions, when executed by the at least one processor, cause the integrated control apparatus and simulator to simulate the performance of the robot using a measured value from the sensor and a derivative of the measured value with respect to time.

9. The integrated control apparatus and simulator according to claim 7, wherein the instructions, when executed by the at least one processor, cause the integrated control apparatus and simulator to change the total measurement period when one of the at least one simulation result does not satisfy the predetermined condition.

10. The integrated control apparatus and simulator according to claim 7, wherein the instructions, when executed by the at least one processor, cause the integrated control apparatus and simulator to repeat changing the total measurement period until one of the at least one simulation result satisfies the predetermined condition.

11. The integrated control apparatus and simulator according to claim 7, wherein the instructions, when executed by the at least one processor, cause the integrated control apparatus and simulator to change the total measurement period such that the total measurement period becomes longer than a current total measurement period.

12. The integrated control apparatus and simulator according to claim 11, wherein the instructions, when executed by the at least one processor, cause the integrated control apparatus and simulator to change the total measurement period by multiplying the current total measurement period by an integer.

13. The integrated control apparatus and simulator according to claim 7, wherein the instructions, when executed by the at least one processor, cause the integrated control apparatus and simulator to compute the initial value based on a value of $\Delta f/(v \times \Delta t)$, wherein $\Delta f$ is a value of the quantization resolution information, $\Delta t$ is a value of the time resolution information, and v is a minimum speed threshold where speeds below the threshold are multiplied by 0.

14. A control method comprising:

receiving resolution information indicating a resolution of a sensor of a robot, the resolution information comprising: i) quantization resolution information indicating a minimum amount of change that can be detected by the sensor, and (ii) time resolution information indicating a minimum time interval between two measurements of the sensor;

determining, for the robot to perform at least one operation, an initial value of a total measurement period for the sensor based on the resolution information;

simulating, using at least one total measurement period value comprising the initial value, the performance of the robot performing the at least one operation;

determining at least one simulation result indicating whether the simulated performance satisfied a predetermined condition with respect to the at least one total measurement period value;

selecting, based on one of the at least one simulation result satisfying the predetermined condition, the corresponding total measurement period as a final measurement period; and outputting the final measurement period to the robot to cause the robot to use the final measurement period when performing the at least one operation.

* * * * *